M. HAYS.
Sap-Spout.
No. 45,996.  Patented Jan. 24, 1865.
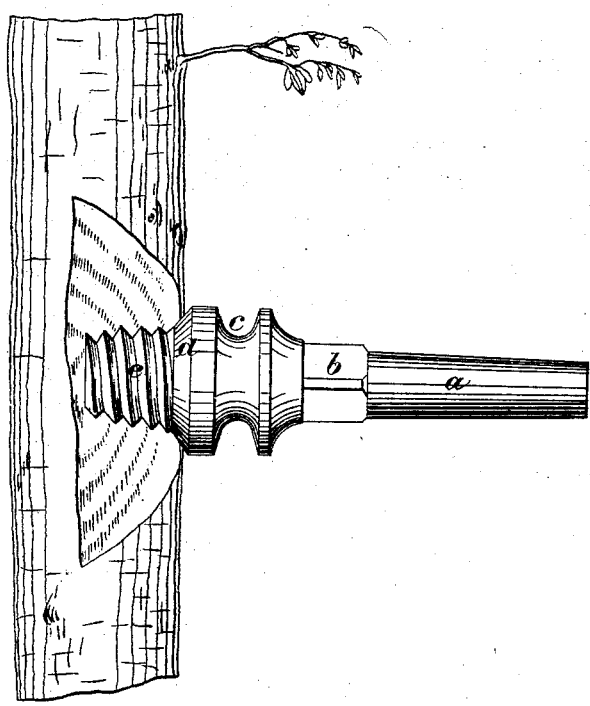
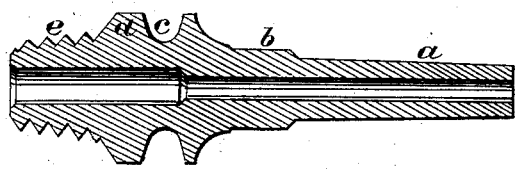
Witnesses:
Theo Zusch
Wm Trewin
Inventor:
Mark Hays
per Munn & Co
Attys.

UNITED STATES PATENT OFFICE.

MARK HAYS, OF WORCESTER, MASSACHUSETTS.

IMPROVED SAP-SPILE.

Specification forming part of Letters Patent No. 45,996, dated January 24, 1865.

*To all whom it may concern:*

Be it known that I, MARK HAYS, of Worcester, in the county of Worcester and State of Massachusetts, have invented a new and Improved Sap-Spile; and I do hereby declare that the following is a full, clear, and exact description thereof, which will enable others skilled in the art to make and use the same, reference being had to the accompanying drawings, forming part of this specification, in which—

Figure 1 is an external view of my invention applied to a tree; Fig. 2, a detached longitudinal central section of the same.

Similar letters of reference indicate like parts.

This invention relates to a new and improved tube for conducting the sap from sugar-maple trees into a pail or vessel prepared to receive it. These devices, however made, retain the name of "spiles," from the fact that wooden plugs or spiles were originally employed for the purpose.

The object of the within-described invention is to obtain a spile for the purpose specified, which will be strong and durable, capable of holding the pail which receives the sap, so that the former will be close to the spile and the sap prevented from being blown over the edge of the same, and one which will prevent the leakage of sap from the tree around the spile.

I construct my spile of metal, wrought or cast, as may be desired. The outer part, $a$, may be of cylindrical form or slightly conical, with a square portion, $b$, at the inner part of $a$, to receive a wrench in adjusting or screwing the spile in the tree. At the back of the square $b$ the spile is considerably enlarged to admit of a circumferential groove, $c$, of sufficient depth to receive the handle or bail of the pail. The portion of the spile at the rear of the groove $c$ is of beveled form, as shown at $d$, and the rear of the spile terminates in a screw, $e$, the diameter of which, at its larger part, is equal to the smaller diameter of $d$, which may be termed a "beveled shoulder." The screw $e$ is screwed into the tree, as shown in Fig. 1, a hole being previously bored into the tree to receive it, the spile having an opening extending entirely through it. The shoulder $d$ is drawn by the screw $e$ snugly into the orifice of the hole in the tree, sufficiently so to prevent the leakage of sap around it.

The operation of screwing the spile into the tree is performed with the greatest facility by applying a wrench to the square $b$. The pail, in consequence of being hung on the spile, is brought quite close to the latter, so that the sap cannot be blown by the wind over the edge of the pail, and the spile being of metal and firmly screwed into the tree is abundantly able to sustain or hold the pail and its contents.

Spiles constructed in this way will last an indefinite period of time, and they may be manufactured at a small cost.

I claim as new and desire to secure by Letters Patent—

A tubular sap-spile provided or formed with a screw to screw into the tree, a circumferential groove extending wholly or partially around the spile to receive the handle of the pail which receives the sap, and a square, $b$, to receive a wrench to screw the spile into the tree, substantially as herein shown and described.

MARK HAYS.

Witnesses:
CHARLES R. CHANT,
AUGUSTUS A. BRIGHAM.